(12) United States Patent
Murzyn (10) Patent No.: US 10,854,024 B2
(45) Date of Patent: Dec. 1, 2020

(54) INSTRUMENT CLUSTER MONITORING SYSTEM

(71) Applicants: DENSO International America, Inc., Southfield, MI (US); DENSO CORPORATION, Kariya (JP)

(72) Inventor: Michael Murzyn, West Bloomfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/245,935

(22) Filed: Jan. 11, 2019

(65) Prior Publication Data

US 2019/0244446 A1    Aug. 8, 2019

Related U.S. Application Data

(60) Provisional application No. 62/625,414, filed on Feb. 2, 2018.

(51) Int. Cl.
| | |
|---|---|
| *G07C 5/08* | (2006.01) |
| *B60K 35/00* | (2006.01) |
| *B60K 37/02* | (2006.01) |

(52) U.S. Cl.
CPC ............ *G07C 5/0825* (2013.01); *B60K 35/00* (2013.01); *B60K 37/02* (2013.01); *G07C 5/0808* (2013.01); *G07C 5/0866* (2013.01); *B60K 2370/176* (2019.05); *B60K 2370/178* (2019.05); *B60K 2370/21* (2019.05); *B60K 2370/34* (2019.05)

(58) Field of Classification Search
CPC .. G07C 5/0825; G07C 5/0808; G07C 5/0866; B60K 35/00; B60K 37/02; B60K 2370/178; B60K 2370/176; B60K 2370/21; B60K 2370/34
See application file for complete search history.

(56) References Cited

U.S. PATENT DOCUMENTS

| | | | |
|---|---|---|---|
| 6,614,477 B1 * | 9/2003 | Lee .................. | H04N 5/335 348/312 |
| 6,927,674 B2 | 8/2005 | Harter, Jr. et al. | |
| 2008/0048879 A1 * | 2/2008 | Lipman .............. | B60K 37/02 340/688 |

FOREIGN PATENT DOCUMENTS

| | | | |
|---|---|---|---|
| CN | 106384095 A | * | 2/2017 |
| JP | 2007285758 A | | 11/2007 |

(Continued)

*Primary Examiner* — Hunter B Lonsberry
*Assistant Examiner* — Elizabeth Yang
(74) *Attorney, Agent, or Firm* — Harness, Dickey & Pierce, P.L.C.

(57) ABSTRACT

Systems and methods for monitoring operation of an instrument cluster configured to display vehicle operating information to a driver. The system includes a camera pointed at the instrument cluster to capture images of operation of the instrument cluster. A control module is in receipt of the images of the instrument cluster. The control module is configured to compare operation of the instrument cluster as captured in the images with predetermined, expected operation of the instrument cluster. A fault condition notification module is configured to generate a fault notice when there is a discrepancy between operation of the instrument cluster as captured in the images and the predetermined, expected operation of the instrument cluster.

16 Claims, 3 Drawing Sheets

(56) References Cited

FOREIGN PATENT DOCUMENTS

KR      101697644 B1 *  1/2017
WO      WO-03057523 A1 *  7/2003  ............. B60K 35/00

* cited by examiner

INSTRUMENT CLUSTER MONITORING SYSTEM

CROSS-REFERENCE TO RELATED APPLICATIONS

This application claims the benefit of U.S. Provisional Application No. 62/625,414, filed on Feb. 2, 2018. The entire disclosure of the above application is incorporated herein by reference.

FIELD

The present disclosure relates to an instrument cluster monitoring system including a camera directed to the instrument cluster to monitor operation thereof.

BACKGROUND

This section provides background information related to the present disclosure, which is not necessarily prior art.

Instrument clusters are often used with vehicles to convey information to a driver or operator regarding the operational state of the vehicle, and fault conditions of features and functions of the vehicle. For example, instrument clusters often include meters or dials to convey vehicle speed, engine speed, engine temperature, fuel level, engine oil level, etc. Instrument clusters also typically include various "tell-tales," which when illuminated provide fault information to the driver. When a fault condition exists, the bulb, LED, or other similar device associated with the tell-tale is illuminated to indicate a fault condition. Critical tell-tales usually go through a prove-out when starting the vehicle to let the driver know that the illumination device is working correctly by illuminating for a certain amount of time.

With current instrument clusters, the driver needs to visibly monitor the instrument cluster to identify a fault condition by not seeing a tell-tale illuminate. Or in some cases, the vehicle Central Processing Unit (CPU) monitors the electrical characteristics of the circuit and can inform the driver of fault by other means (e.g., warning sound from a speaker). As the automotive industry moves from analog type instrument clusters towards digital instrument clusters using TFT displays or similar technology, it would be desirable to have a more definite way to ensure that the instrument cluster is correctly being displayed. The present disclosure advantageously provides for an improved system for monitoring operation of an instrument cluster.

SUMMARY

This section provides a general summary of the disclosure, and is not a comprehensive disclosure of its full scope or all of its features.

The present disclosure is directed to systems and methods for monitoring operation of an instrument cluster configured to display vehicle operating information to a driver. The system includes a camera pointed at the instrument cluster to capture images of operation of the instrument cluster. A control module is in receipt of the images of the instrument cluster. The control module is configured to compare operation of the instrument cluster as captured in the images with predetermined, expected operation of the instrument cluster. A fault condition notification module is configured to generate a fault notice when there is a discrepancy between operation of the instrument cluster as captured in the images and the predetermined, expected operation of the instrument cluster.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
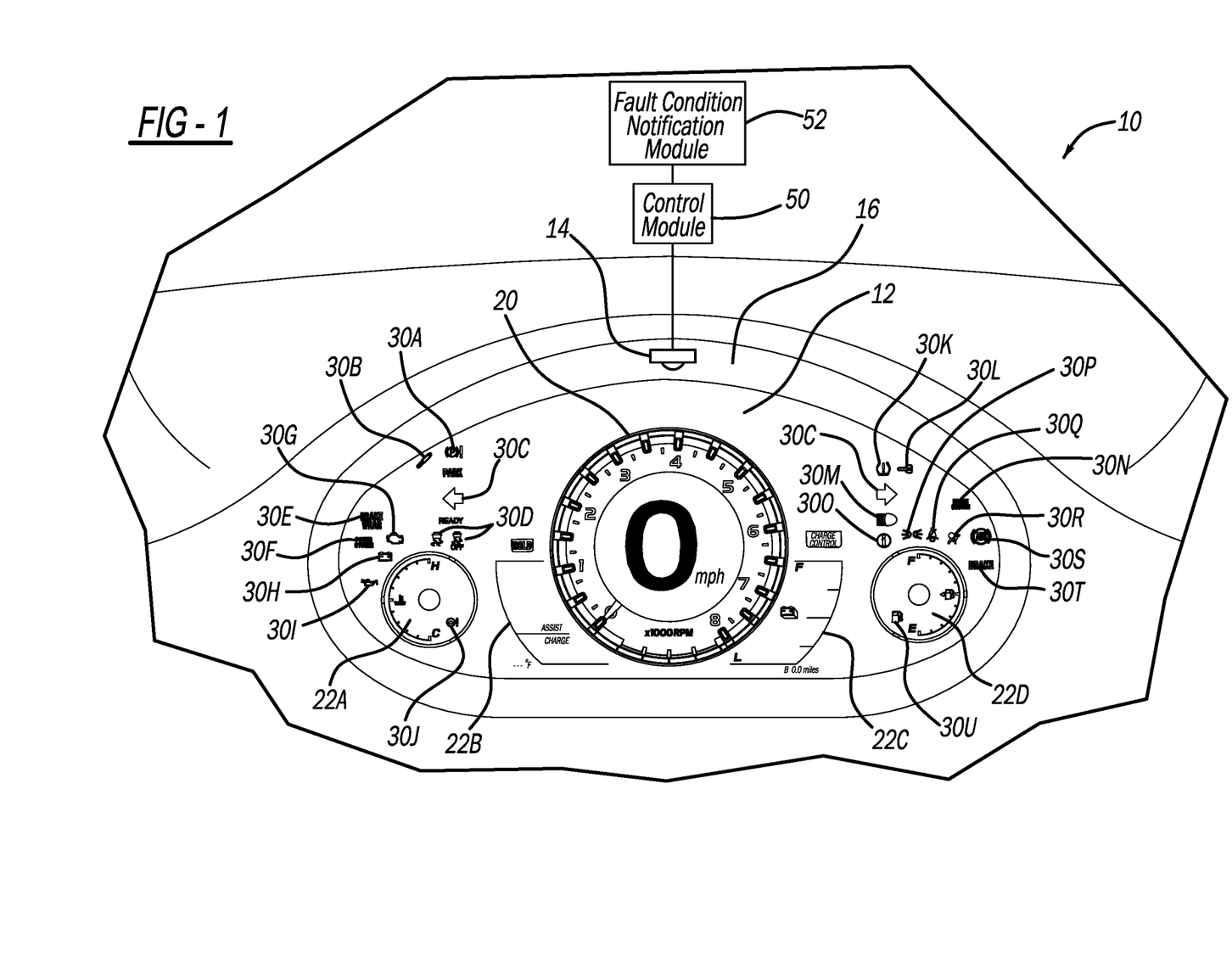
FIG. 1 illustrates an exemplary instrument cluster and a camera in accordance with the present disclosure for monitoring operation of the instrument cluster.

FIG. 1 illustrates a system 10 in accordance with the present disclosure for monitoring operation of an instrument cluster 12 configured to display vehicle operating information to a driver. The instrument cluster 12 may be any suitable instrument cluster for conveying operating information of any suitable vehicle to a driver of the vehicle. Exemplary vehicles include, but are not limited to the following: passenger vehicles; mass transit vehicles; utility vehicles; recreational vehicles; construction vehicles/equipment; military vehicles/equipment; aircraft; watercraft, etc.

The system 10 monitors operation of the instrument cluster 12 with any suitable camera 14. Although FIG. 1 illustrates a single camera 14, any suitable number of cameras may be included as appropriate in order to monitor a desired area of the instrument cluster 12. The camera 14 may be included in a common housing 16 with the instrument cluster 12. Alternatively, the camera 14 may be arranged at any other suitable location as long as the camera 14 is pointed at (directly or indirectly) the instrument cluster 12 in order to visually capture operation thereof.

The instrument cluster 12 may have any suitable meters, dials, tell-tales, displays, etc. suitable for conveying vehicle operating information to the driver. In the example of FIG. 1, the instrument cluster 12 includes a center dial 20, which may be a physical dial or a virtual dial displayed on a display (such as any suitable TFT, LCD, etc. display) of the instrument cluster 12. The center dial 20 may be configured to display any suitable information, such as engine speed and/or vehicle speed. The example of FIG. 1 also includes the following exemplary sub-meters/dials (which may be physical dials or virtual dials displayed on any suitable display screen): engine temperature dial 22A; assist/charge dial 22B; battery level dial 22C; and fuel level dial 22D.

The instrument cluster 12 also includes a plurality of tell-tales 30A-30U. The telltales 30A-30U include text and/or graphics that are illuminated in order to convey vehicle operating information to the driver. The tell-tales 30A-30U may be illuminated in any suitable manner, such as with a lightbulb, LED, or any other suitable illumination device. The tell-tales may also be virtual tell-tales displayed on any suitable display screen (such as any suitable TFT, LCD, etc. display).

The example of FIG. 1 includes the following exemplary tell-tales, although any other suitable tell-tales may be included: parking brake light tell-tale 30A; suspension damper tell-tale 30B; turn signal tell-tales 30C; traction control tell-tales 30D; brake wear tell-tale 30E; power system tell-tale 30F; check engine tell-tale 30G; check battery tell-tale 30H; low oil pressure tell-tale 30I; temperature warning tell-tale 30J; tire pressure warning tell-tale 30K; door lock system tell-tale 30L; high-beam lights active tell-tale 30M; brake system tell-tale 30N; info tell-tale 30O; low-beam headlights active tell-tale 30P; fasten seatbelt tell-tale 30Q; airbag warning tell-tale 30R; antilock brake system warning tell-tale 30S; check brakes tell-tale 30T; and low fuel warning 30U.

The system 10 further includes a control module 50 and a fault condition notification module 52. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein, such as the control module 50 and the fault condition notification module 52. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 50 controls operation of the camera 14, and controls the fault condition notification module 52. The control module 50 receives image data of the instrument cluster 12 captured by the camera 14. The control module 50 may also receive vehicle operating information from any suitable sensors or other onboard control modules of the vehicle. The vehicle operating information includes the vehicle operating information displayed by the instrument cluster 12 at the center dial 20, the sub-dials 22A-22D, and the tell-tales 30A-30U.

The control module 50 compares operation of the instrument cluster 12 as captured in the images taken by the camera 14, with expected operation thereof, and previous operation thereof, to identify fault conditions. For example and as explained further in the method 110 of FIG. 2, the control module 50 will analyze the image data for each dial 20, 22A-22D and each tell-tale 30A-30U to determine whether the dial or tell-tale is illuminated, has an expected shape, and has an expected color. The control module 50 can be configured to perform this analysis and comparison at any suitable time, such as during a prove-out phase of a vehicle start when all of the dials 20, 22A-22D are activated and moved through their range, and when all of the tell-tales 30A-30U are illuminated. This analysis may also be performed continuously during operation of the vehicle.

The control module 50 instructs the fault condition notification module 52 to generate a fault notice when: the dial or tell-tale is not illuminated when it is expected to be; the dial or tell-tale has an irregular shape that does not match expectations (which may indicate improper display by the display screen or misalignment of components of the instrument cluster 12); or the dial or tell-tale has an irregular color that does not match expectations (which may also indicate improper display by the display screen or misalignment of components of the instrument cluster 12). The fault notice generated by the fault condition notification module 52 may be any suitable fault notice, such as a fault notice conveyed to the driver on a redundant display screen in the passenger cabin, a fault warning chime generated by a speaker in the passenger cabin, and/or a fault message transmitted to the driver in any suitable manner, such as by text message to the driver's portable electronic device and/or by email message.

Figure 2:
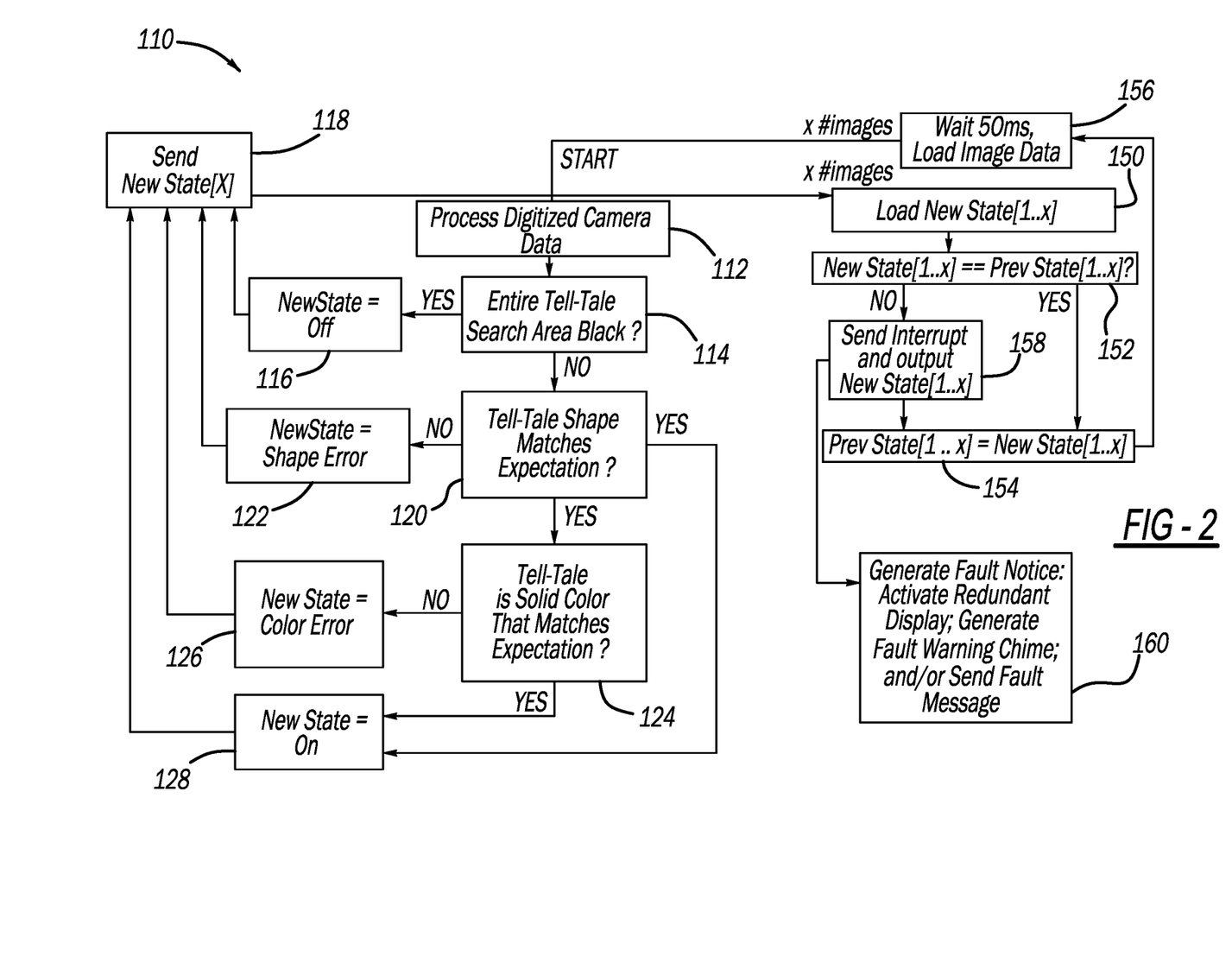
FIG. 2 illustrates a method for monitoring functionality of the instrument cluster using the camera of FIG. 1.

FIG. 2 illustrates a method 110 in accordance with the present disclosure for monitoring operation of the instrument cluster 12 to display the vehicle operating information to the driver. The method 110 includes additional details regarding operation of the control module 50 and the fault condition notification module 52. The method 110 is performed for the tell-tales 30A-30U and/or the dials 20, 22A-22D individually. The method 110 may be performed for each one of the tell-tales 30A-30U and the dials 20, 22A-22D, or for only select ones of the tell-tales 30A-30U and dials 20, 22A-22D predetermined to be the most significant.

The method 110 may be performed during a prove-out condition, such as at vehicle startup, when all of the tell-tales 30A-30U are activated (and thus should be illuminated) and the dials 20, 22A-22D are activated (and typically illuminated) and moved throughout their range. Alternatively or in addition to performing the method 110 during the prove-out, the method 110 may be performed continuously during vehicle operation. For example, the control module 50 may instruct the camera 14 to capture an image of the instrument cluster 12 once every 50 ms-100 ms. The camera 14 can be configured to capture a single image of the entire instrument cluster 12, from which the control module 50 isolates portions of the captured image (e.g., particular pixels of the captured image) located where the various dials 20 and 22A-22D and tell-tales 30A-30U are expected to be located.

Operation of the method 110 will now be described in detail with respect to analysis of an exemplary one of the tell-tales 30A-30U, such as the tell-tale 30A, which when illuminated informs the driver that the parking brake of the vehicle is engaged. At block 112 of the method 110, the control module 50 processes digitized camera data captured by the camera 14 from an area of the captured image corresponding to where the parking brake light 30A is expected to be present. The control module 50 searches this area for an illumination. If the entire search area is black (i.e., no portion of the tell-tale 30A is illuminated) the method 110 proceeds to block 116 where the control module 50 determines that the tell-tale 30A is off, and assigns the tell-tale 30A a new state that is equal to off. From block 116 the method 110 proceeds to block 118, where the new state is sent to block 150, which is further described herein. If at block 114 the control module 50 determines that the entire search area is not black, the method 110 proceeds to block 120.

At block 120 the control module 50 analyzes the shape of the illuminated tell-tale 30A, and compares the shape of the illuminated tell-tale 30A with an expected shape of the tell-tale 30A stored in the control module 50. The expected shape is the shape that the tell-tale 30A is expected to have when fully illuminated. If the shape of the tell-tale 30A as captured by the camera 14 does not match the expected shape, the method 110 proceeds to block 122. At block 122, the control module 50 determines that a shape error has occurred, and assigns the tell-tale 30A with a new state equal to a shape error. From block 122 the method 110 proceeds to block 118. This new state is sent to, and loaded at, block 150, as described herein. If at block 120 the shape of the tell-tale 30A as captured by the camera 14 matches the expected shape, the method 110 proceeds to blocks 124 and 128.

At block 124, the control module 50 compares the color of the tell-tale 30A as captured by the camera 14 with an expected color (stored in the control module 50) of the tell-tale 30A when illuminated. If the color as captured by the camera 14 does not match the expected color, the method 110 proceeds to block 126. At block 126, the control module 50 determines that the illuminated tell-tale 30A has a color error, and assigns the tell-tale 30A with a new state equal to a color error, which is sent to blocks 118 and 150. If at block 124 the control module 50 determines that the color of the tell-tale 30A captured by the camera 14 matches the expected color, the method 110 proceeds to block 128. At block 128, the control module 50 determines that the tell-tale 30A is properly illuminated, and assigns the tell-tale 30A with a new state equal to "on." From block 128, the method 110 proceeds to block 118.

After the new state has been loaded at block 150, the method 110 proceeds to block 152. At block 152, the control module 50 compares the loaded new state with a state that was previously loaded at block 150. The previously loaded state may be the state of the tell-tale as it left the manufacturer, which would have confirmed that the tell-tale 30A was functioning properly. In other words, the very first "previous" state is a fully functioning state as confirmed and tested by the manufacturer. Subsequent "previous states" will be states of the tell-tale sensed by the control module 50 using the method 110, for example.

If the new state is equal to the state previously loaded at block 150, the method 110 proceeds to block 154. At block 154, the new state is assigned as the previous state to make way for a new state when the method 110 is repeated. From block 154 the method 110 proceeds to block 156. At block 156, the control module 50 waits a predetermined period of time, such as 50 ms.-100 ms. to load additional image data 156 captured by the camera 14 of the tell-tale 30A. After the predetermined time period has expired, the method 110 returns to block 112.

If at block 152 the control module 50 determines that the new state is not equal to the previous state loaded to block 150, the method 110 proceeds to block 158. At block 158, the control module 50 sends an interrupt and outputs the new state to block 154 and block 160. From block 154 the method 110 proceeds to block 156 as described above.

At block 160, the control module 50 instructs the fault condition notification module 52 to generate any suitable fault notice to inform the driver that the tell-tale 30A is not functioning as intended. For example, the fault notice may be displayed on a redundant display located at any suitable position about the passenger cabin. The fault notice may also be in the form of a warning chime and/or fault message sent to the driver. The fault message may be conveyed to the driver in any suitable manner, such as in the form of a text message to the driver's personal electronic device (such as a smartphone or tablet) or to the driver's email account.

In some applications, the control module 50 may be configured to compare operation of the instrument cluster 12 as captured in the images taken by the camera 14, with "real-time" vehicle operating information input to the control module 50 from various vehicle sensors. When the control module 50 identifies a discrepancy between operation of the instrument cluster 12 as captured in the images and the vehicle operating information, the control module 50 instructs the fault condition notification module 52 to generate a fault notice. For example, if the control module 50 receives a signal from a fuel level sensor indicating that the fuel tank is 50% full, but an image captured by the camera 14 shows that the fuel dial 22D is at the 100% full position, the control module 50 will instruct the fault condition notification module 52 to generate a fault notice.

With respect to the tell-tales 30A-30U, if for example the control module 50 is in receipt of a signal from a vehicle tire pressure sensor indicating that the pressure of one or more of the tires has fallen below a predetermined critical level, but images of the tire pressure warning tell-tale 30K show that the tell-tale 30K is not illuminated, has a shape that does not match an expected shape, and/or has a color that does not match a predetermined expected color, the control module 50 will instruct the fault condition notification module 52 to generate a fault notice. The control module 50 will also instruct the fault condition notification module 52 to generate a fault notice when any one of the other tell-tales 30A-30J and 30L-30U are not illuminated when the vehicle condition they are assigned to is present, or the tell-tales are illuminated, but have a shape and/or color that does not match an expected shape and/or color.

Figure 3:
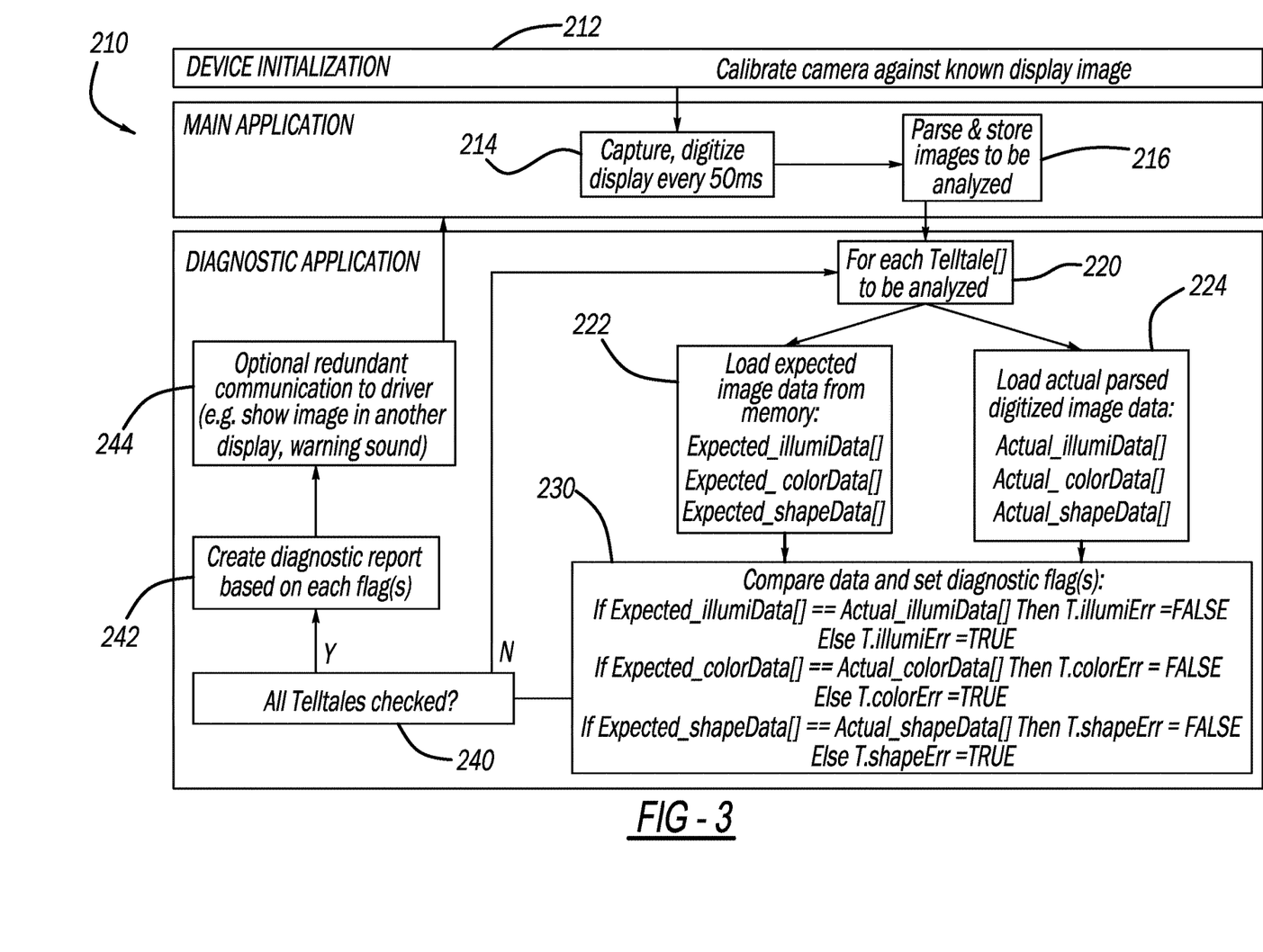
FIG. 3 illustrates another method for monitoring functionality of the instrument cluster using the camera of FIG. 1.

FIG. 3 illustrates another method in accordance with the present disclosure for monitoring operation of the instrument cluster 12 to display the vehicle operating information to the driver. With reference to block 212, the camera 14 is calibrated by the control module 50 against a known display image. After the camera 14 has been calibrated, the method 210 proceeds to block 214. At block 214, the control module 50 controls the camera 14 to capture and digitize the instrument cluster 12 every 50 ms, or at any other suitable interval. From block 214 the method 210 proceeds to block 216. At block 216, the control module 50 parses and stores images captured by the camera 14 to be analyzed. For example, an image of each one of the tell-tales 30A-30U and/or an image of each one of the dials 20, 22A-22D may be parsed and stored to be analyzed.

For each tell-tale 30A-30U and/or each dial 20A, 22A, 22D to be analyzed, the control module 50 loads expected image data from a memory of the control module 50 at block 222. Various different parameters of the expected image data are loaded, such as expected illumination data, expected color data, and expected shape data (see block 222). With reference to block 224, for each tell-tale to be analyzed the control module 50 loads the actual parsed digitized image data captured by the camera 14. Exemplary actual parsed digitized image data corresponds to the loaded expected image data of block 222. Exemplary actual parsed digitized image data includes actual illumination data, actual color data, and actual shape data.

With reference to block 230, the control module 50 compares the loaded expected image data (see block 222) with the loaded actual parsed digitized image data (see block 224). At block 230, when the control module 50 determines that the expected illumination data equals the actual illumination data, then the control module 50 determines that the illumination error equals false. If the expected illumination data does not equal the actual illumination data, then the control module 50 determines that the illumination error equals true. When the control module 50 determines that the expected color data equals the actual color data, then the control module 50 determines that the color error equals false. If the expected color data does not equal the actual color data, then the control module 50 determines that the color error equals true. When the control module 50 determines that the expected shape data equals the actual shape data, then the control module 50 determines that the shape error equals false. If the expected shape data does not equal the actual shape data, then the control module 50 determines that the shape error equals true.

At block 240, the control module 50 determines whether or not all of the tell-tales 30A-30U (and optionally all of the dials (20, 22A-22D) have been checked. If they have not been checked, the method 210 returns to block 220 until all of the tell-tales 30A-30U and optionally all of the dials 20, 22A-22D have been checked. Once all have been checked, the method 210 proceeds to block 242. At block 242, the control module 50 generates a diagnostic report based on any diagnostic flags set forth at block 230. Based on the diagnostic report, the fault condition notification module 52 generates a fault notification. Any suitable fault notification may be generated, such as the activation of a redundant display, generation of a fault warning chime, and/or generation of a fault message (see block 244). From block 244, the method 210 returns to either block 212 or block 214.

The system 10 and methods 110 and 210 are configured to account for various vehicle system tolerances. Exemplary tolerances include location of the dials 20, 22A-22D, and location of the tell-tales 30A-30U to be monitored relative to the position of the camera 14. Specific tolerances include, but are not limited to, component installation tolerances (X, Y, Z), applique tolerances (size, position, rotation, color), display tolerances (missing pixels, rotation, color shift), camera tolerances (fisheye), and vehicle dynamic tolerances (e.g., vibration). To account for the tolerances, when searching for and extracting the portion of the image captured by the camera 14 where the dial 20, 22A-22D or the tell-tale 30A-30U is expected to be located, the control module 50 uses known landmarks for location calibration, such as, sum of absolute differences (SAD) and/or edge detection filters, or any other suitable image processing techniques, to extract the object data from the object image captured by the camera 14. This calibration may be performed by the manufacturer of the system 10, or included as part of the vehicle startup process and thus performed each time the vehicle is started.

The present disclosure thus advantageously provides for a system 10 and methods 110 and 210 for informing a driver of a vehicle when there is a discrepancy between the operation of the instrument cluster 12 as captured by the camera 14 and expected operation of the instrument cluster 12 based on an expected shape and/or color of the tell-tales 30A-30U or the dials 20, 22A-22D, and/or current operating conditions of the vehicle. This eliminates the need for the driver to manually inspect the tell-tales 30A-30U or the dials 20, 22A-22D himself or herself.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the

What is claimed is:

1. A system for monitoring operation of an instrument cluster configured to display vehicle operating information to a driver, the system comprising:
   a camera pointed at the instrument cluster to capture images of operation of the instrument cluster including images of tell-tales of the instrument cluster that convey vehicle operating information to the driver when illuminated;
   a control module in receipt of the images of the instrument cluster, the control module configured to compare operation of the instrument cluster as captured in the images with predetermined, expected operation of the instrument cluster; and
   a fault condition notification module configured to generate a fault notice when there is a discrepancy between operation of the instrument cluster as captured in the images and the predetermined, expected operation of the instrument cluster;
   wherein for each one of the tell-tales, the control module is configured to scan a predetermined location of the instrument cluster captured by the camera where the tell-tale is present and identify whether the predetermined location is black or at least partially illuminated; and
   wherein for each one of the tell-tales, the control module is configured to determine that the tell-tale is in an off state when the predetermined location where the tell-tale is present is black.

2. The system of claim 1, wherein the control module is further in receipt of the vehicle operating information, and the control module is further configured to compare operation of the instrument cluster as captured in the images with the vehicle operating information; and
   wherein the fault condition notification module is further configured to generate a fault notice when there is a discrepancy between operation of the instrument cluster as captured in the images and the vehicle operating information.

3. The system of claim 1, wherein the camera is in a common housing with the instrument cluster.

4. The system of claim 1, wherein the tell-tales include at least one of the following: a traction control tell-tale; a parking brake light tell-tale; a suspension damper tell-tale; a turn-signal tell-tale; a check engine tell-tale; a power steering tell-tale; a battery warning tell-tale; a low oil pressure tell-tale; a temperature warning tell-tale; a tire pressure warning tell-tale; a high-beam light active tell-tale; a headlights active tell-tale; a fasten seatbelt tell-tale; a brake system warning tell-tale; a low-fuel tell-tale; an anti-lock brake warning tell-tale; and an airbag warning tell-tale.

5. The system of claim 1, wherein for each one of the tell-tales the control module is configured to compare a shape of the tell-tale as captured in the image taken by the camera with an expected shape of the tell-tale; and
   wherein the control module determines that the tell-tale has a shape error when the tell-tale captured in the image taken by the camera is shaped different than the expected shape of the tell-tale.

6. The system of claim 1, wherein for each one of the tell-tales the control module is configured to compare a color of the tell-tale as captured in the image taken by the camera with an expected color of the tell-tale; and
   wherein the control module determines that the tell-tale has a color error when the tell-tale captured in the image taken by the camera is colored different than the expected color of the tell-tale.

7. The system of claim 1, wherein the control module controls the camera to capture the image of the instrument cluster once every 50 ms to 100 ms.

8. A method for monitoring operation of an instrument cluster configured to display vehicle operating information to a driver, the method comprising:
   capturing images of operation of the instrument cluster with a camera pointed at the instrument cluster, including capturing images of tell-tales of the instrument cluster that convey vehicle operating information to the driver when illuminated;
   comparing operation of the instrument cluster as captured in the images with predetermined, expected operation of the instrument cluster, the comparison made by a control module in receipt of the images of the instrument cluster; and
   generating a fault notice with a fault condition notification module when there is a discrepancy between operation of the instrument cluster as captured in the images and the predetermined, expected operation of the instrument cluster;
   for each one of the tell-tales, scanning with the control module a predetermined location of the instrument cluster captured by the camera where the tell-tale is present and identifying whether the predetermined location is black or at least partially illuminated; and
   for each one of the tell-tales, determining with the control module that the tell-tale is in an off state when the predetermined location where the tell-tale is present is black.

9. The method of claim 8, further comprising comparing with the control module operation of the instrument cluster as captured in the images with vehicle operating information received by the control module; and
   generating a fault notice with the fault condition notification module when there is a discrepancy between operation of the instrument cluster as captured in the images and the vehicle operating information.

10. The method of claim 8, wherein the tell-tales include at least one of the following: a traction control tell-tale; a parking brake light tell-tale; a suspension damper tell-tale; a turn-signal tell-tale; a check engine tell-tale; a power steering tell-tale; a battery warning tell-tale; a low oil pressure tell-tale; a temperature warning tell-tale; a tire pressure warning tell-tale; a high-beam light active tell-tale; a headlights active tell-tale; a fasten seatbelt tell-tale; a brake system warning tell-tale; a low-fuel tell-tale; an anti-lock brake warning tell-tale; and an airbag warning tell-tale.

11. The method of claim 8, further comprising, for each one of the tell-tales, comparing with the control module a shape of the tell-tale as captured in the image taken by the camera with the expected shape of the tell-tale; and
   determining with the control module that the tell-tale has a shape error when the tell-tale captured in the image taken by the camera has a different shape than the expected shape of the tell-tale.

12. The method of claim 8, further comprising, for each one of the tell-tales, comparing with the control module a color of the tell-tale as captured in the image taken by the camera with the expected color of the tell-tale; and determining with the control module that the tell-tale has a color error when the tell-tale captured in the image taken by the camera has a different color than the expected color of the tell-tale.

13. The method of claim 8, further comprising capturing the image of the operation of the instrument cluster with the camera once every 50 ms to 100 ms.

14. The method of claim 8, wherein generating a fault notice includes displaying a fault notice on a redundant display apart from the instrument cluster.

15. The method of claim 8, wherein generating a fault notice includes at least one of generating a fault warning chime and generating an electronic fault message.

16. The method of claim 8, further comprising calibrating the control module to account for one or more of the following tolerances: component installation tolerances; applique tolerances; display tolerances; camera tolerances; and vehicle dynamics tolerances.

\* \* \* \* \*